United States Patent
Kim et al.

(10) Patent No.: US 11,262,877 B2
(45) Date of Patent: Mar. 1, 2022

(54) TOUCH INPUT DEVICE

(71) Applicant: HiDeep Inc., Seongnam-si (KR)

(72) Inventors: Jae Hee Kim, Seongnam-si (KR); Joo Hyun Go, Seongnam-si (KR); Young Ho Cho, Seongnam-si (KR)

(73) Assignee: HiDeep Inc.

( * ) Notice: Subject to any disclaimer, the term of this patent is extended or adjusted under 35 U.S.C. 154(b) by 0 days.

(21) Appl. No.: 16/325,310

(22) PCT Filed: Jun. 16, 2017

(86) PCT No.: PCT/KR2017/006320
§ 371 (c)(1),
(2) Date: Feb. 13, 2019

(87) PCT Pub. No.: WO2018/034415
PCT Pub. Date: Feb. 22, 2018

(65) Prior Publication Data
US 2019/0227692 A1 Jul. 25, 2019

(30) Foreign Application Priority Data
Aug. 19, 2016 (KR) .................. 10-2016-0105770

(51) Int. Cl.
*G06F 3/041* (2006.01)
*G06F 3/044* (2006.01)
*H02M 3/07* (2006.01)

(52) U.S. Cl.
CPC ............ *G06F 3/0443* (2019.05); *G06F 3/041* (2013.01); *G06F 3/0412* (2013.01);
(Continued)

(58) Field of Classification Search
CPC ...... G06F 3/04184; G06F 3/044; G06F 3/041; G06F 3/0412; G06F 3/0446;
(Continued)

(56) References Cited

U.S. PATENT DOCUMENTS 8,274,481 B2 9/2012 Nishimura et al.
9,535,526 B2 1/2017 Goo et al.
(Continued)

FOREIGN PATENT DOCUMENTS

CN 105117080 A 12/2015
JP 2000047808 2/2000
(Continued)

OTHER PUBLICATIONS

International Search Report for Corresponding Application No. PCT/KR2017/006320, dated Oct. 13, 2017. WO.

*Primary Examiner* — Mark W Regn
(74) *Attorney, Agent, or Firm* — The Belles Group, P.C.

(57) ABSTRACT

A touch input device capable of detecting a touch position and touch pressure may be provided that includes: a display panel; a touch sensor including a touch electrode which is used to detect the touch position; and a pressure sensor including a pressure electrode which is used to detect the touch pressure. A harmonic frequency and a frequency of a horizontal synchronization signal, which is used to drive the display panel, do not exist within a first gap from a touch pressure sensing frequency which is used to drive the pressure sensor. The first gap may be 5 kHz.

13 Claims, 12 Drawing Sheets

(52) U.S. Cl.
CPC .......... *G06F 3/0445* (2019.05); *G06F 3/0446* (2019.05); *G06F 3/04166* (2019.05); *G06F 3/04184* (2019.05); *H02M 3/07* (2013.01)

(58) Field of Classification Search
CPC ................ G06F 3/0445; G06F 3/0443; G06F 2203/04105; G06F 3/04166; G06F 2203/04106; G06F 3/0418; G06F 3/0414; H02M 3/07
See application file for complete search history.

(56) References Cited

U.S. PATENT DOCUMENTS

| | | | |
|---|---|---|---|
| 2001/0038358 A1* | 11/2001 | Tserkovnyuk | ......... G09G 3/003 345/5 |
| 2007/0262966 A1* | 11/2007 | Nishimura | ............. G06F 3/044 345/173 |
| 2011/0155479 A1* | 6/2011 | Oda | .................... G06F 3/03545 178/18.06 |
| 2016/0024188 A1 | 1/2016 | Van Den Brink et al. | |
| 2017/0235414 A1* | 8/2017 | Ding | .................... G06F 3/0445 345/174 |
| 2017/0255325 A1* | 9/2017 | Xiao | ....................... G06F 3/044 |

FOREIGN PATENT DOCUMENTS

| | | |
|---|---|---|
| KR | 10-20100048236 | 5/2010 |
| KR | 10-20110026765 | 3/2011 |
| KR | 10-20120060365 | 6/2012 |
| WO | 2006043660 | 4/2006 |

\* cited by examiner

TOUCH INPUT DEVICE

CROSS-REFERENCE TO RELATED PATENT APPLICATIONS

The present application is a U.S. national stage application under 35 U.S.C. § 371 of PCT Application No. PCT/KR2017/006320, filed Jun. 16, 2017, which claims priority to Korean Patent Application No. 10-2016-0105770, filed Aug. 19, 2016. The disclosures of the aforementioned priority applications are incorporated herein by reference in their entireties.

TECHNICAL FIELD

The present disclosure relates to a touch input device and more particularly to a touch input device configured to detect a touch position and touch pressure, the touch input device reducing the influence of noise among touch position sensing, touch pressure sensing, and display panel, so that display quality can be improved and touch position sensing sensitivity and touch pressure sensing sensitivity can be further increased.

BACKGROUND ART

Various kinds of input devices are being used to operate a computing system. For example, the input device includes a button, key, joystick and touch screen. Since the touch screen is easy and simple to operate, the touch screen is increasingly being used to operate the computing system.

The touch screen may constitute a touch surface of a touch input device including a touch sensor which may be a transparent panel including a touch-sensitive surface. The touch sensor is attached to the front side of a display screen, and then the touch-sensitive surface may cover the visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

Here, a data signal, a scan signal, etc., for displaying images are input to the display panel of the touch input device. Also, these signals may affect the sensing of the touch position. These signals may act as noise, so that the accuracy of the touch position sensing is reduced. Further, a drive signal or a sensing signal which is driven when touch pressure is sensed acts as noise, so that display quality is reduced. Therefore, there is a demand for a touch input device capable of reducing the influence of mutual noise among the touch position sensing, touch pressure sensing, and display panel.

DISCLOSURE

Technical Problem

The object of the present invention is to provide a touch input device capable of reducing the influence of noise between touch pressure sensing and a display panel and between touch position sensing and the display panel.

Technical Solution

One embodiment is a touch input device capable of detecting a touch position and touch pressure. The touch input device may include: a display panel; a touch sensor including a touch electrode which is used to detect the touch position; and a pressure sensor including a pressure electrode which is used to detect the touch pressure. A harmonic frequency of a horizontal synchronization signal, which is used to drive the display panel, may not exist within a first gap from a touch pressure sensing frequency which is used to drive the pressure sensor. The first gap may be 5 kHz. Here, a frequency of the horizontal synchronization signal may not exist within the first gap.

Another embodiment is a touch input device capable of detecting a touch position and touch pressure. The touch input device may include: a display panel; a touch sensor including a touch electrode which is used to detect the touch position; and a pressure sensor including a pressure electrode which is used to detect the touch pressure. A touch pressure sensing frequency which is used to drive the pressure sensor is the same as a touch position sensing frequency which is used to drive the touch sensor. A harmonic frequency of a horizontal synchronization signal, which is used to drive the display panel, may not exist within a first gap from the touch pressure sensing frequency. The harmonic frequency of the horizontal synchronization signal, which is used to drive the display panel, may exist within a second gap from the touch pressure sensing frequency. The first gap may be 5 kHz and the second gap may be 20 kHz. Here, a frequency of the horizontal synchronization signal may not exist within the first gap, and the frequency of the horizontal synchronization signal may exist within the second gap.

Advantageous Effects

According to the embodiment of the present invention, it is possible to provide a touch input device capable of reducing the effect of noise between touch pressure sensing and a display panel and between touch position sensing and the display panel.

MODE FOR INVENTION

Figure 1A:
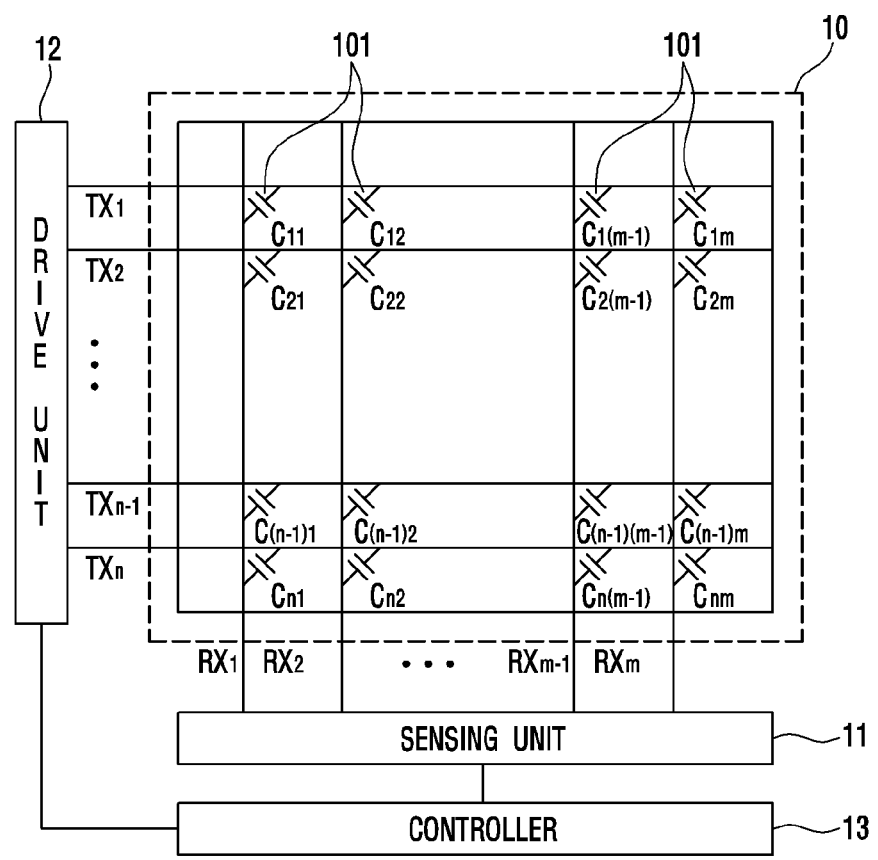
FIGS. 1a and 1b are schematic views of a capacitance type touch sensor according to an embodiment of the present invention and a configuration for the operation of the same.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Similar reference numerals in the drawings designate the same or similar functions in many aspects.

Hereinafter, a touch input device which enables pressure detection in accordance with an embodiment of the present invention will be described with reference to the accompanying drawings. In the below description, while a capacitance type touch sensor 10 is exemplified, a touch sensor 10 capable of detecting a touch position in any manner can be applied.

FIG. 1a is schematic views of a configuration of the capacitance type touch sensor 10 included in the touch input device according to the embodiment of the present invention and the operation of the capacitance type touch sensor. Referring to FIG. 1a, the touch sensor 10 may include a plurality of drive electrodes TX1 to TXn and a plurality of receiving electrodes RX1 to RXm, and may include a drive unit 12 which applies a drive signal to the plurality of the drive electrodes TX1 to TXn for the purpose of the operation of the touch sensor 10, and a sensing unit 11 which detects the touch and the touch position by receiving from the plurality of the receiving electrodes RX1 to RXm a sensing signal including information on a capacitance change amount changing according to the touch on a touch surface.

As shown in FIG. 1a, the touch sensor 10 may include the plurality of drive electrodes TX1 to TXn and the plurality of receiving electrodes RX1 to RXm. While FIG. 1a shows that the plurality of drive electrodes TX1 to TXn and the plurality of receiving electrodes RX1 to RXm of the touch sensor 10 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

The plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

Figure 9A:
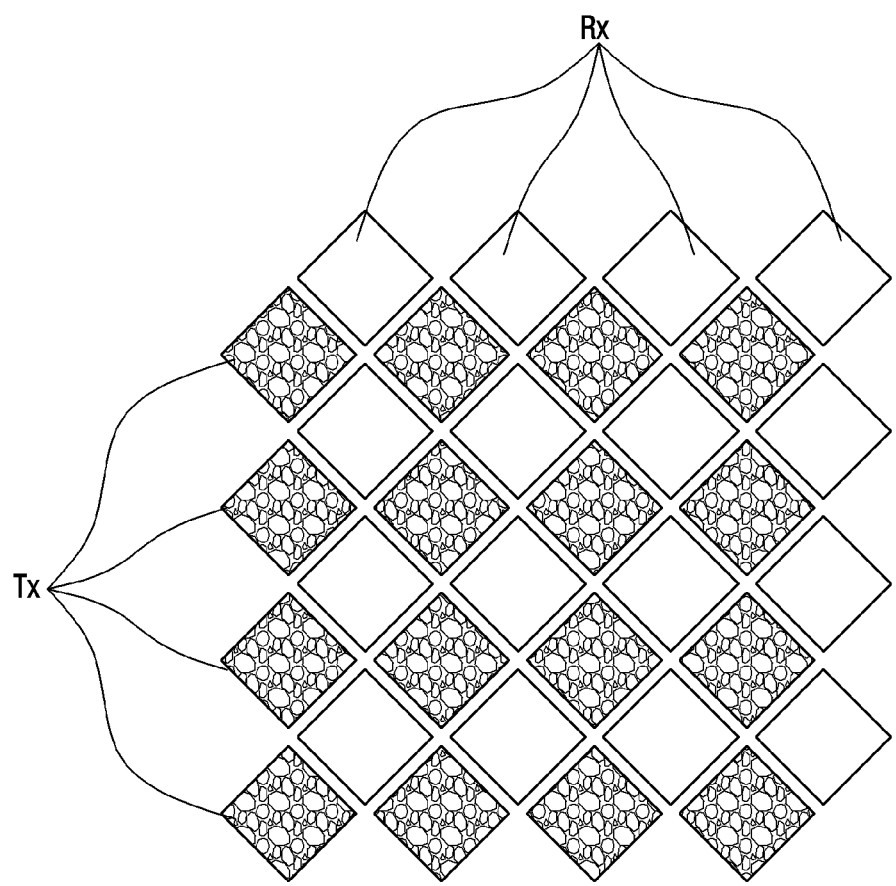
FIGS. 9a to 9d are views showing forms of the electrode included in the touch input device according to the embodiment of the present invention.
Figure 9B:
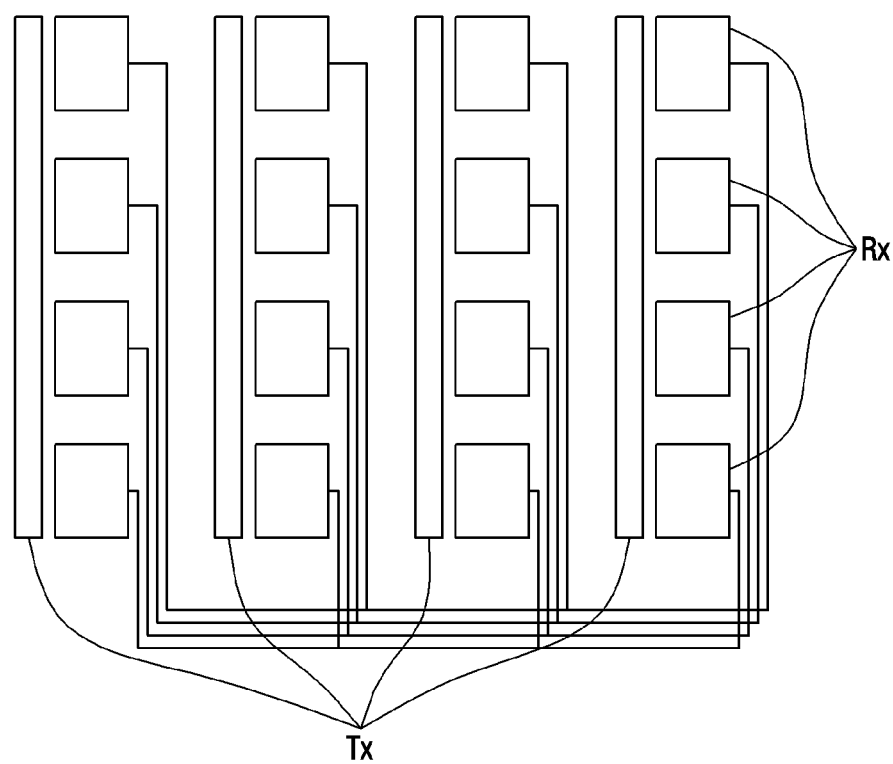

As shown in FIGS. 9a and 9b, in the touch sensor 10 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on a top surface of a display module 200 to be described later.

Figure 9C:
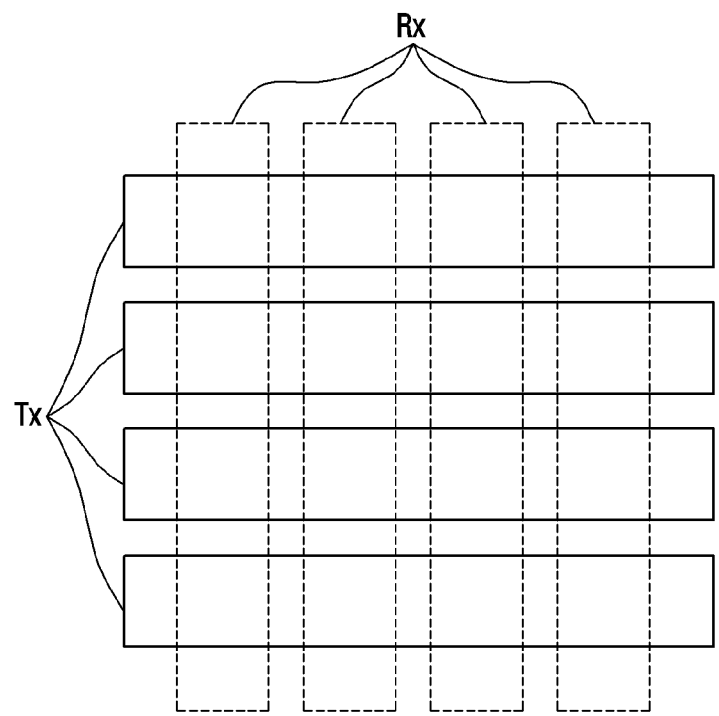

Also, as shown in FIG. 9c, the plurality of drive electrodes TX1 to TXn and the plurality of receiving electrodes RX1 to RXm may be formed in different layers. For example, any one of the plurality of drive electrodes TX1 to TXn and the plurality of receiving electrodes RX1 to RXm may be formed on the top surface of the display module 200, and the other may be formed on a bottom surface of a cover to be described later or may be formed within the display module 200.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh.

The drive unit 12 according to the embodiment of the present invention may apply a drive signal to the drive electrodes TX1 to TXn. In the embodiment of the present invention, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (Cm) 14 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor 10.

For example, the sensing unit 11 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (Cm) 14, and then converts the integrated current signal into voltage. The sensing unit 11 may further include an analog to digital converter (ADC) (not shown) which converts the integrated data by the receiver into digital data. Later, the digital data may be input to a processor (not shown) and processed to obtain information on the touch on the touch sensor 10. The sensing unit 11 may include the ADC and processor as well as the receiver.

A controller 13 may perform a function of controlling the operations of the drive unit 12 and the sensing unit 11. For example, the controller 13 generates and transmits a drive control signal to the drive unit 12, so that the driving signal can be applied to a predetermined drive electrode TX1 at a predetermined time. Also, the controller 13 generates and transmits the drive control signal to the sensing unit 11, so that the sensing unit 11 may receive the sensing signal from the predetermined receiving electrode RX at a predetermined time and perform a predetermined function.

In FIG. 1a, the drive unit 12 and the sensing unit 11 may constitute a touch detection device (not shown) capable of detecting whether the touch has occurred on the touch sensor 10 or not and where the touch has occurred. The touch detection device may further include the controller 13. In the touch input device including the touch sensor 10, the touch detection device may be integrated and implemented on a touch sensing integrated circuit (IC). The drive electrode TX and the receiving electrode RX included in the touch sensor 10 may be connected to the drive unit 12 and the sensing unit 11 included in the touch sensing IC through, for example, a conductive trace and/or a conductive pattern printed on a circuit board, or the like. The touch sensing IC may be placed on a circuit board on which the conductive pattern has been printed, for example, a first printed circuit board (hereafter, referred to as a first PCB). According to the embodiment, the touch sensing IC may be mounted on a main board for operation of the touch input device.

As described above, a capacitance (Cm) with a predetermined value is generated at each crossing of the drive electrode TX and the receiving electrode RX. When an object like a finger approaches close to the touch sensor 10, the value of the capacitance may be changed. In FIG. 1a, the capacitance may represent a mutual capacitance (Cm). The sensing unit 11 senses such electrical characteristics, thereby being able to sense whether the touch has occurred on the touch sensor 10 or not and where the touch has occurred. For example, the sensing unit 11 is able to sense whether the touch has occurred on the surface of the touch sensor 10 comprised of a two-dimensional plane consisting of a first axis and a second axis.

More specifically, when the touch occurs on the touch sensor 10, the drive electrode TX to which the driving signal has been applied is detected, so that the position of the second axial direction of the touch can be detected. Likewise, when the touch occurs on the touch sensor 10, the capacitance change is detected from the reception signal received through the receiving electrode RX, so that the position of the first axial direction of the touch can be detected.

Up to now, although the operation mode of the touch sensor 10 sensing the touch position has been described on the basis of the mutual capacitance change amount between the drive electrode TX and the receiving electrode RX, the embodiment of the present invention is not limited to this. That is, as shown in FIG. 1b, it is also possible to detect the touch position on the basis of the change amount of a self-capacitance.

Figure 1B:
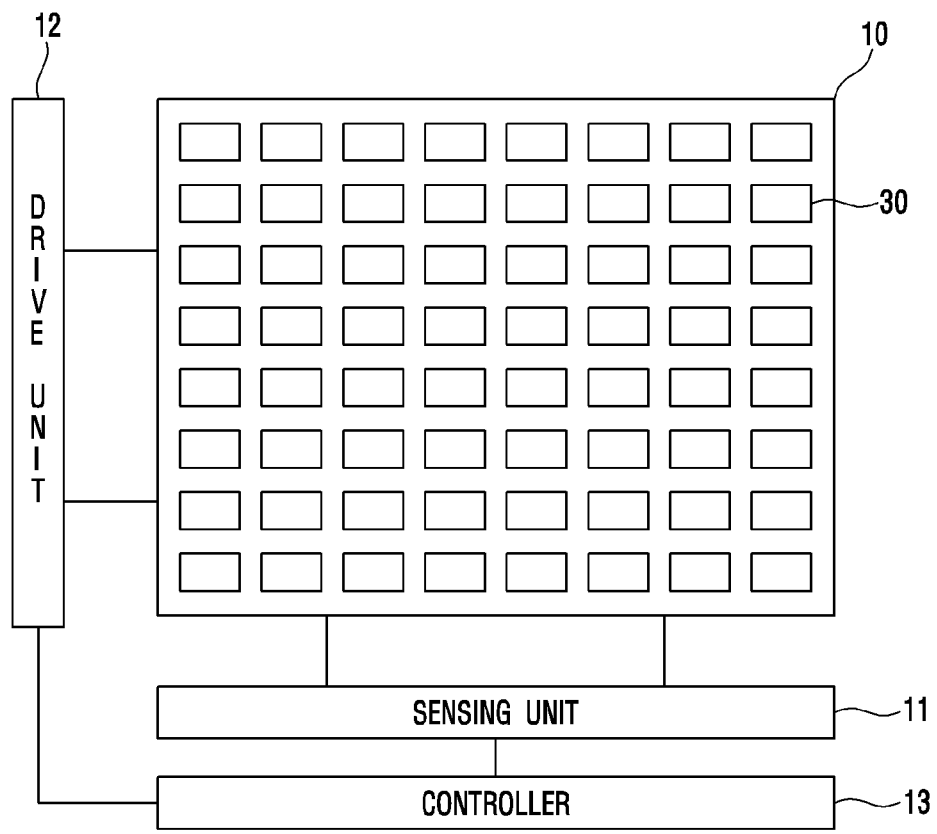
Figure 9D:
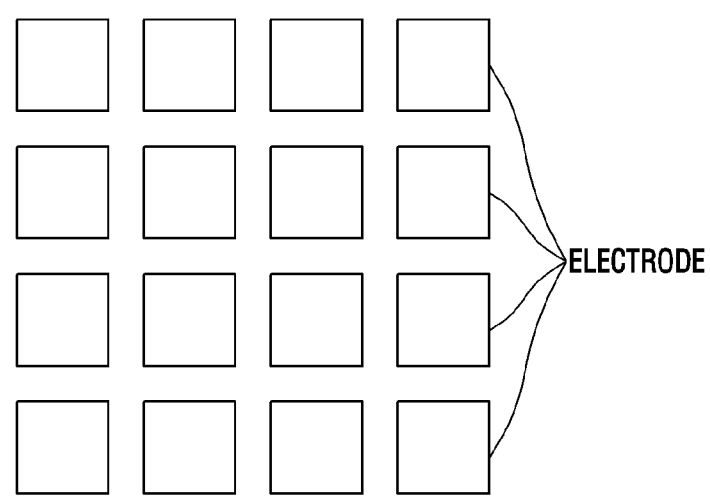

FIG. 1b is schematic views of a configuration of another capacitance type touch sensor 10 included in the touch input device according to another embodiment of the present invention and the operation of the capacitance type touch sensor. A plurality of touch electrodes 30 are provided on the touch sensor 10 shown in FIG. 1b. Although the plurality of touch electrodes 30 may be, as shown in FIG. 9d, disposed at a regular interval in the form of a grid, the present invention is not limited to this.

The drive control signal generated by the controller 13 is transmitted to the drive unit 12. On the basis of the drive control signal, the drive unit 12 applies the drive signal to the predetermined touch electrode 30 during a predetermined time period. Also, the drive control signal generated by the controller 13 is transmitted to the sensing unit 11. On the basis of the drive control signal, the sensing unit 11 receives the sensing signal from the predetermined touch electrode 30 during a predetermined time period. Here, the sensing signal may be a signal for the change amount of the self-capacitance formed on the touch electrode 30.

Here, whether the touch has occurred on the touch sensor 10 or not and/or the touch position are detected by the sensing signal detected by the sensing unit 11. For example, since the coordinate of the touch electrode 30 has been known in advance, whether the touch of the object on the surface of the touch sensor 10 has occurred or not and/or the touch position can be detected.

In the foregoing, for convenience of description, it has been described that the drive unit 12 and the sensing unit 11 operate individually as a separate block. However, the operation to apply the drive signal to the touch electrode 30 and to receive the sensing signal from the touch electrode 30 can be also performed by one drive and sensing unit.

Figure 2:
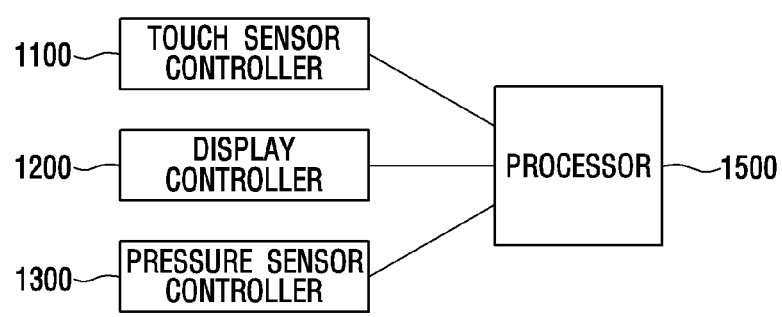
FIG. 2 shows a control block for controlling a touch position, touch pressure, and display operation in a touch input device including a display panel.

FIG. 2 shows a control block for controlling a touch position, touch pressure, and display operation in a touch input device including a display panel. In the touch input device 1000 configured to detect the touch pressure in addition to the display function and touch position detection, the control block may include the above-described touch sensor controller 1100 for detecting the touch position, a display controller 1200 for driving the display panel, and a pressure sensor controller 1300 for detecting the pressure. The display controller 1200 may include a control circuit which receives an input from an application processor (AP) or a central processing unit (CPU) on a main board for the operation of the touch input device 1000 and displays the contents that the user wants on the display panel 200A. The control circuit may include a display panel control IC, a graphic controller IC, and a circuit required to operate other display panel 200A.

The pressure sensor controller 1300 for detecting the pressure through a pressure sensor may be configured similarly to the touch sensor controller 1100, and thus, may operate similarly to the touch sensor controller 1100.

According to the embodiment, the touch sensor controller 1100, the display controller 1200, and the pressure sensor controller 1300 may be included as different components in the touch input device 1000. For example, the touch sensor controller 1100, the display controller 1200, and the pressure sensor controller 1300 may be composed of different chips respectively. Here, a processor 1500 of the touch input device 1000 may function as a host processor for the touch sensor controller 1100, the display controller 1200, and the pressure sensor controller 1300.

The touch input device 1000 according to the embodiment of the present invention may include an electronic device including a display screen and/or a touch screen, such as a cell phone, a personal data assistant (PDA), a smartphone, a tablet personal computer (PC).

In order to manufacture such a slim and lightweight light-weighing touch input device 1000, the touch sensor controller 1100, the display controller 1200, and the pressure sensor controller 1300, which are, as described above, formed separately from each other, may be integrated into one or more configurations in accordance with the embodiment of the present invention. In addition to this, these controllers can be integrated into the processor 1500 respectively. Also, according to the embodiment of the present invention, the touch sensor 10 and/or the pressure sensor may be integrated into the display panel 200A.

In the touch input device 1000 according to the embodiment of the present invention, the touch sensor 10 for detecting the touch position may be positioned outside or inside the display panel 200A. The display panel 200A of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel.

FIGS. 3a to 3f are conceptual views showing a relative position of a display electrode with respect to the display panel 200A in the touch input device 1000 according to the embodiment of the present invention. First, the configuration of the display panel 200A using an LCD panel will be described with reference to FIGS. 3a to 3c.

Figure 3A:
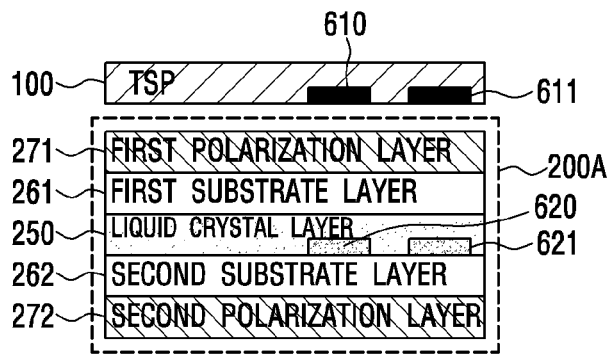
FIGS. 3a to 3f are conceptual views showing relative positions of a touch sensor and a pressure sensor with respect to the display panel in the touch input device according to the embodiment of the present invention.
Figure 3B:
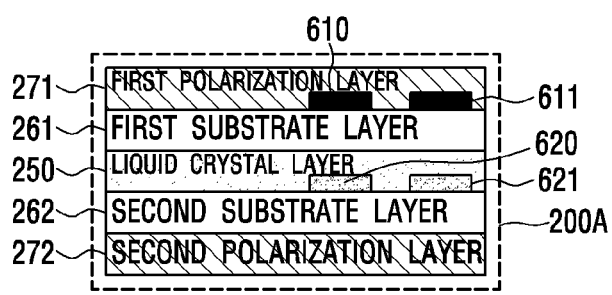
Figure 3C:
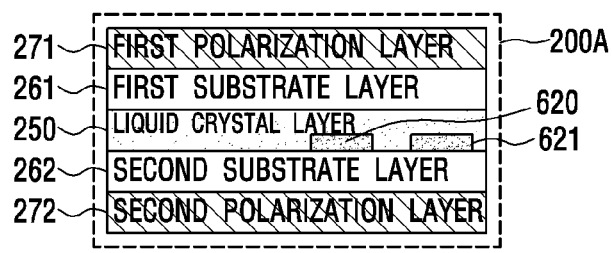

As shown in FIGS. 3a to 3c, the LCD panel may include a liquid crystal layer 250 including a liquid crystal cell, a first substrate layer 261 and a second substrate layer 262 which are disposed on both sides of the liquid crystal layer 250 and include electrodes, a first polarization layer 271 formed on a side of the first substrate layer 261 in a direction facing the liquid crystal layer 250, and a second polarization layer 272 formed on a side of the second substrate layer 262 in the direction facing the liquid crystal layer 250. Here, the first substrate layer 261 may be made of color filter glass, and the second substrate layer 262 may be made of TFT glass. Also, according to the embodiment, at least one of the first substrate layer 261 and the second substrate layer 262 may be made of a bendable material such as plastic. In FIGS. 3a to 3c, the second substrate layer 262 may be comprised of various layers including a data line, a gate line, TFT, a common electrode Vcom, and a pixel electrode, etc. These electrical components may operate in such a manner as to generate a controlled electric field and orient liquid crystals located in the liquid crystal layer 250.

Next, the configuration of the display panel 200A using an OLED panel will be described with reference to FIGS. 3d to 3f.

Figure 3D:
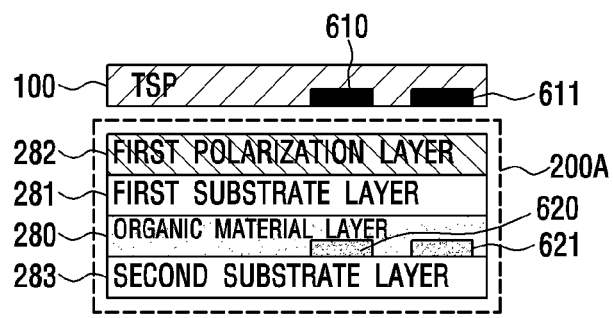
Figure 3E:
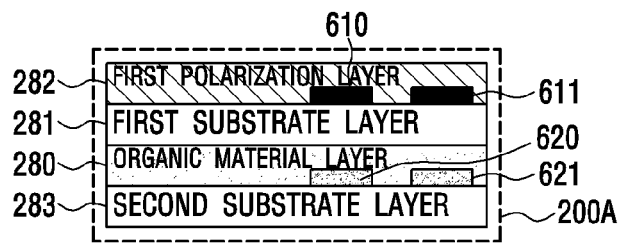
Figure 3F:
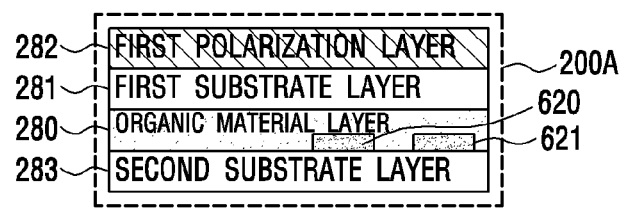

As shown in FIGS. 3d to 3f, the OLED panel may include an organic material layer 280 including an organic light-emitting diode (OLED), a first substrate layer 281 and a second substrate layer 283 which are disposed on both sides of the organic material layer 280 and include electrodes, and a first polarization layer 282 formed on a side of the first substrate layer 281 in a direction facing the organic material layer 280. Here, the first substrate layer 281 may be made of encapsulation glass, and the second substrate layer 283 may be made of TFT glass. Also, according to the embodiment, at least one of the first substrate layer 281 and the second substrate layer 283 may be made of a bendable material such as plastic. The OLED panel shown in FIGS. 3d to 3f may include an electrode used to drive the display panel 200A, such as a gate line, a data line, a first power line (ELVDD), a second power line (ELVSS), etc. The organic light-emitting diode (OLED) panel is a self-light emitting display panel which uses a principle where, when current flows through a fluorescent or phosphorescent organic thin film and then electrons and electron holes are combined in the organic material layer, so that light is generated. The organic material constituting the light emitting layer determines the color of the light.

Specifically, the OLED uses a principle in which when electricity flows and an organic matter is applied on glass or plastic, the organic matter emits light. That is, the principle is that electron holes and electrons are injected into the anode and cathode of the organic matter respectively and are recombined in the light emitting layer, so that a high energy exciton is generated and the exciton releases the energy while falling down to a low energy state and then light with a particular wavelength is generated. Here, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. None of them require a backlight. Therefore, the OLED enables a very thin display module to be implemented, has a constant contrast ratio according to an angle and obtains good color reproductivity depending on a temperature. Also, it is very economical in that non-driven pixel does not consume power.

In terms of operation, the PM-OLED emits light only during a scanning time at a high current, and the AM-OLED maintains a light emitting state only during a frame time at a low current. Therefore, the AM-OLED has a resolution higher than that of the PM-OLED and is advantageous for driving a large area display panel and consumes low power. Also, a thin film transistor (TFT) is embedded in the AM-OLED, and thus, each component can be individually controlled, so that it is easy to implement a delicate screen.

It will be apparent to a skilled person in the art that the LCD panel or the OLED panel may further include other structures so as to perform the display function and may be deformed.

FIGS. 3a and 3d show that, in the touch input device 1000, the touch sensor 10 is disposed outside the display panel 200A. The touch sensor panel may be disposed on the display panel 200A, and third electrode 610 and a fourth electrode 611 may be included in the touch sensor panel. The touch surface of the touch input device 1000 may be the surface of the touch sensor panel. Also, a first electrode 620 and a second electrode 621 may be disposed on the second substrate layers 262 and 283.

FIGS. 3b, 3c, 3e, and 3f show that, in the touch input device 1000, the touch sensor 10 is disposed inside the display panel 200A.

FIGS. 3b and 3e show that the third electrode 610 and the fourth electrode 611 are disposed between the first substrate layers 261 and 281 and the first polarization layers 271 and 282. Here, the touch surface of the touch input device 1000 is the outer surface of the display panel 200A and may be the top surface or the bottom surface of FIGS. 3b and 3e. Also, the first electrode 620 and the second electrode 621 may be disposed on the second substrate layers 262 and 283.

In FIGS. 3c and 3f, the first electrode 620 and the second electrode 621 may be disposed on the second substrate layers 262 and 283.

The touch surface of the touch input device 1000 shown in FIGS. 3a to 3f is the outer surface of the display panel 200A and may be the top surface or the bottom surface of the display panel 200A. Here, in FIGS. 3a to 3f, the top surface or the bottom surface of the display panel 200A, which can be the touch surface, may be covered with a cover layer (not shown) in order to protect the display panel 200A.

Further, at least one of the first electrode 620 and the second electrode 621 may be an electrode used to drive the display panel 200A. Specifically, when the display panel 200A is the LCD panel, at least one of the first electrode 620 and the second electrode 621 may include at least one of a data line, a gate line, TFT, a common electrode Vcom, and a pixel electrode, etc. When the display panel 200A is the OLED panel, at least one of the first electrode 620 and the second electrode 621 may include a data line, a gate line, a first power line (ELVDD), and a second power line (ELVSS). Further, although FIGS. 3a to 3f show that the first electrode 620 and the second electrode 621 are disposed on the second substrate layers 262 and 283, there is no limitation to this. The first electrode 620 and the second electrode 621 may be disposed under the first substrate layers 261 and 281, or alternatively one of the first electrode 620 and the second electrode 621 may be disposed on the second substrate layers 262 and 283, and the other may be disposed under the first substrate layers 261 and 281.

Also, according to the embodiment of the present invention, at least a portion of the touch sensor 100 may be configured to be placed within the display panel 200A and at least a portion of the remaining touch sensor may be configured to be placed outside the display panel 200A. For example, one of the drive electrode TX and the receiving electrode RX, which constitute the touch sensor panel, may be configured to be placed outside the display panel 200A, and the other may be configured to be placed inside the display panel 200A. When the touch sensor 10 is placed within the display panel 200A, an electrode for operation of the touch sensor may be additionally disposed. However, various configurations and/or electrodes positioned inside the display panel 200A may be used as the touch sensor 10 for sensing the touch. Also, according to the embodiment of the present invention, at least a portion of the touch sensor 10 may be configured to be placed between the first substrate layers 261 and 281 and the second substrate layers 262 and 283 which are included in the display panel 200A. Here, the remaining portion other than the at least a portion of the touch sensor may be disposed both within the display panel 200A and at a position other than between the first substrate layers 261 and 281 and the second substrate layers 262 and 283.

Next, a method for detecting the touch position by using a portion of the first electrode 620, the second electrode 621, the third electrode 610, and the fourth electrode 611 shown in FIGS. 3a to 3f will be described.

The touch sensor 10 of the touch input device 1000 shown in FIGS. 3a, 3b, 3d, and 3e may be composed of the third electrode 610 and the fourth electrode 611. Specifically, the third electrode 610 and the fourth electrode 611 may function as the drive electrode and the receiving electrode described in FIG. 1a and may detect the touch position in accordance with the mutual capacitance between the third electrode 610 and the fourth electrode 611. Also, the third electrode 610 and the fourth electrode 611 may function as the single electrode 30 described in FIG. 1b and the touch position may be detected based on the self-capacitance of each of the third electrode 610 and the fourth electrode 611.

Further, the touch sensor 10 of the touch input device 1000 shown in FIGS. 3b and 3e may be composed of the third electrode 610 and the first electrode 620. Specifically, the third electrode 610 and the first electrode 620 may function as the drive electrode and the receiving electrode described in FIG. 1a and the touch position may be detected based on the mutual capacitance between the third electrode 610 and the first electrode 620. Here, when the first electrode 620 is used to drive the display panel 200A, the display panel 200A may be driven in a first time interval and the touch position may be detected in a second time interval different from the first time interval.

The touch sensor 10 of the touch input device 1000 shown in FIGS. 3c and 3f may be composed of the first electrode 620 and the second electrode 621. Specifically, the first electrode 620 and the second electrode 621 may function as the drive electrode and the receiving electrode described in FIG. 1a and the touch position may be detected based on the mutual capacitance between the first electrode 620 and the second electrode 621. Also, the first electrode 620 and the second electrode 621 may function as the single electrode 30 described in FIG. 1b and the touch position may be detected based on the self-capacitance of each of the first electrode 620 and the second electrode 621. Here, when the first electrode 620 and/or the second electrode 621 are used to drive the display panel 200A, the display panel 200A may be driven in the first time interval and the touch position may be detected in the second time interval different from the first time interval.

Next, a method for detecting the touch pressure by using a portion of the first electrode 620, the second electrode 621, the third electrode 610, and the fourth electrode 611 shown in FIGS. 3a to 3f will be described.

The pressure sensor of the touch input device 1000 shown in FIGS. 3a, 3b, 3d, and 3e may be composed of the third electrode 610 and the fourth electrode 611. Specifically, when pressure is applied to the touch surface, a distance between the pressure sensor and a reference potential layer (not shown) which is spaced from the pressure sensor and is placed on, under or within the display panel 200A changes. Due to the distance change between the pressure sensor and the reference potential layer, the mutual capacitance between the third electrode 610 and the fourth electrode 611 may change. As such, the touch pressure can be detected according to the mutual capacitance between the third electrode 610 and the fourth electrode 611. Here, when the touch sensor 10 is composed of the third electrode 610 and the fourth electrode 611, it is possible to detect the touch position and simultaneously to detect the touch pressure. Further, the touch position may be detected in the first time interval, and the touch pressure may be detected in the second time interval different from the first time interval. Also, when the first electrode 620 and/or the second electrode 621 used to drive the display panel 200A are disposed between the reference potential layer and the third electrode 610 and the fourth electrode 611, which are pressure sensors, the first electrode 620 and/or the second electrode 621 may be floating during the time interval in which the touch pressure is detected, in order to detect the capacitance change according to the distance change between the pressure sensor and the reference potential layer.

Also, the pressure sensor of the touch input device 1000 shown in FIGS. 3a, 3b, 3d, and 3e may be composed of at least one of the third electrode 610 and the fourth electrode 611. Specifically, when pressure is applied to the touch surface, the distance between the pressure sensor and the reference potential layer (not shown) which is spaced from the pressure sensor and is placed on, under or within the display panel 200A changes. Due to the distance change between the pressure sensor and the reference potential layer, the capacitance between the third electrode 610 and the reference potential layer, that is, the self-capacitance of the third electrode 610 and/or the capacitance between the fourth electrode 611 and the reference potential layer, that is, the self-capacitance of the fourth electrode 611 may change. As such, the touch pressure can be detected according to the self-capacitance of the third electrode 610 and/or the fourth electrode 611. Here, when the touch sensor 10 is composed of the third electrode 610 and the fourth electrode 611, it is possible to detect the touch position and simultaneously to detect the touch pressure. Also, the touch position may be detected in the first time interval, and the touch pressure may be detected in the second time interval different from the first time interval. Further, when the first electrode 620 and/or the second electrode 621 used to drive the display panel 200A are disposed between the reference potential layer and the third electrode 610 and/or the fourth electrode 611, which are pressure sensors, the first electrode 620 and/or the second electrode 621 may be floating during the time interval in which the touch pressure is detected, in order to detect the capacitance change according to the distance change between the pressure sensor and the reference potential layer.

The pressure sensor of the touch input device 1000 shown in FIGS. 3b and 3e may be composed of the third electrode 610 and the first electrode 620. Specifically, when pressure is applied to the touch surface, the distance between the pressure sensor and the reference potential layer (not shown) which is spaced from the pressure sensor and is placed on, under or within the display panel 200A changes. Due to the distance change between the pressure sensor and the reference potential layer, the mutual capacitance between the third electrode 610 and the first electrode 620 may change. As such, the touch pressure can be detected according to the mutual capacitance between the third electrode 610 and the first electrode 620. Here, when the touch sensor 100 includes at least one of the third electrode 610 and the first electrode 620, it is possible to detect the touch position and simultaneously to detect the touch pressure. Also, the touch position may be detected in the first time interval, and the touch pressure may be detected in the second time interval different from the first time interval. Here, when the electrode used to drive the display panel 200A includes at least one of the first electrode 620 and the second electrode 621, not only the display panel 200A can be driven but also the touch pressure can be detected. Also, the display panel 200A may be driven in the first time interval and the touch pressure may be detected in the second time interval different from the first time interval. Here, when the touch sensor 100 includes at least one of the third electrode 610 and the fourth electrode 611 and the electrode used to drive the display panel 200A includes at least one of the first electrode 620 and the second electrode 621, not only the display panel 200A can be driven but also the touch position and the touch pressure can be detected. Further, the touch position may be detected in the first time interval, the touch pressure may be detected in the second time interval different from the first time interval, and the display panel 200A may be driven in a third time interval different from the first time interval and the second time interval. Also, when the second electrode 621 used to drive the display panel 200A is disposed between the reference potential layer and the third electrode 610 which is the pressure sensor, the second electrode 621 may be floating during the time interval in which the touch pressure is detected, in order to detect the capacitance change according to the distance change between the pressure sensor and the reference potential layer.

The pressure sensor of the touch input device 1000 shown in FIGS. 3a to 3f may be composed of the first electrode 620 and the second electrode 621. Specifically, when pressure is applied to the touch surface, the distance between the pressure sensor and the reference potential layer (not shown) which is spaced from the pressure sensor and is placed on, under or within the display panel 200A changes. Due to the distance change between the pressure sensor and the reference potential layer, the mutual capacitance between the first electrode 620 and the second electrode 621 may change. As such, the touch pressure can be detected according to the mutual capacitance between the first electrode 620 and the second electrode 621. Here, when the electrode used to drive the display panel 200A includes at least one of the first electrode 620 and the second electrode 621, the touch pressure can be detected simultaneously with driving the display panel 200A. Also, the display panel 200A may be driven in the first time interval and the touch pressure may be detected in the second time interval different from the first time interval. Here, when the touch sensor 10 includes at least one of the first electrode 620 and the second electrode 621, it is possible to detect the touch position and simultaneously to detect the touch pressure. Also, the touch position may be detected in the first time interval, and the touch pressure may be detected in the second time interval different from the first time interval. Here, when the touch sensor 10 includes at least one of the first electrode 620 and the second electrode 621 and the electrode used to drive the display panel 200A includes at least one of the first electrode 620 and the second electrode 621, the touch position and the touch pressure can be detected simultaneously with driving the display panel 200A. Further, the touch position may be detected in the first time interval, the touch pressure may be detected in the second time interval different from the first time interval, and the display panel 200A may be driven in the third time interval different from the first time interval and the second time interval.

Also, the pressure sensor of the touch input device 1000 shown in FIGS. 3a to 3f may be composed of at least one of the first electrode 620 and the second electrode 621. Specifically, when pressure is applied to the touch surface, the distance between the pressure sensor and the reference potential layer (not shown) which is spaced from the pressure sensor and is placed on, under or within the display panel 200A changes. Due to the distance change between the pressure sensor and the reference potential layer, the capacitance between the first electrode 620 and the reference potential layer, that is, the self-capacitance of the first electrode 620 and/or the capacitance between the second electrode 621 and the reference potential layer, that is, the self-capacitance of the second electrode 621 may change. As such, the touch pressure can be detected according to the self-capacitance of the first electrode 620 and/or the second electrode 621. Here, when the electrode used to drive the display panel 200A includes at least one of the first electrode 620 and the second electrode 621, the touch pressure can be detected simultaneously with driving the display panel 200A. Also, the display panel 200A may be driven in the first time interval and the touch pressure may be detected in the second time interval different from the first time interval.

Here, when the touch sensor 10 includes at least one of the first electrode 620 and the second electrode 621, it is possible to detect the touch position and simultaneously to detect the touch pressure. Also, the touch position may be detected in the first time interval, and the touch pressure may be detected in the second time interval different from the first time interval. Here, when the touch sensor 10 includes at least one of the first electrode 620 and the second electrode 621 and the electrode used to drive the display panel 200A includes at least one of the first electrode 620 and the second electrode 621, the touch position and the touch pressure can be detected simultaneously with driving the display panel 200A. Further, the touch position may be detected in the first time interval, the touch pressure may be detected in the second time interval different from the first time interval, and the display panel 200A may be driven in the third time interval different from the first time interval and the second time interval.

Here, the reference potential layer may be disposed on the display panel 200A. Specifically, the reference potential layer may be disposed between the display panel 200A and the cover layer which is disposed on the display panel 200A and functions to protect the display panel 200A. More specifically, the reference potential layer may be formed on the bottom surface of the cover layer. Further, the distance between the reference potential layer and the pressure sensor should be changeable at the time of applying the pressure to the touch input device 1000. Therefore, a spacer layer may be disposed between the reference potential layer and the pressure sensor. When the pressure sensor does not include the first electrode 620 or the second electrode 621 in the touch input device 1000 shown in FIGS. 3a and 3d, the reference potential layer may be disposed between the pressure sensor and the display panel 200A or disposed on the pressure sensor.

According to the embodiment, the spacer layer may be implemented by an air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed on the display panel 200A, the spacer layer may be made of a transparent material.

In addition, the reference potential layer may be disposed under the display panel 200A. Specifically, the reference potential layer may be formed on a below-described substrate disposed under the display panel 200A, or the substrate itself may serve as the reference potential layer. Also, the reference potential layer may be disposed on the substrate and under the display panel 200A. The reference potential layer may be disposed on the cover which performs a function of protecting the display panel 200A, or the cover itself may serve as the reference potential layer. The display panel 200A is bent by applying pressure to the touch input device 1000. A distance between the reference potential layer and the pressure sensor may be changed by the bending of the display panel 200A. Also, the spacer layer may be disposed between the reference potential layer and the pressure sensor. Specifically, the spacer layer may be disposed between the display panel 200A and the substrate on which the reference potential layer has been disposed or between the display panel 200A and the cover on which the reference potential layer has been disposed. Also, in the touch input device 1000 shown in FIGS. 3a and 3d, when the pressure sensor does not include the first electrode 620 or the second electrode 621, the spacer layer may be disposed on the display panel 200A.

Likewise, according to the embodiment, the spacer layer may be implemented by an air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed under the display panel 200A, the spacer layer may be made of a transparent material.

Also, the reference potential layer may be disposed within the display panel 200A. Specifically, the reference potential layer may be disposed on the top surfaces or bottom surfaces of the first substrate layers 261 and 281 of the display panel 200A or on the top surfaces or bottom surfaces of the second substrate layers 262 and 283. More specifically, the reference potential layer may include at least one of the first electrode 620 and the second electrode 621. When pressure is applied to the touch input device 1000, the display panel 200A is bent. Due to the bending of the display panel 200A, the distance between the reference potential layer and the pressure sensor may be changed. Also, the spacer layer may be disposed between the reference potential layer and the pressure sensor. In the touch input device 1000 shown in FIGS. 3a and 3d, the pressure sensor does not include the first electrode 620 or the second electrode 621, the spacer layer may be disposed on or within the display panel 200A. In the touch input device 1000 shown in FIGS. 3b, 3c, 3e, and 3f, the spacer layer may be disposed within the display panel 200A.

Likewise, according to the embodiment, the spacer layer may be implemented by an air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed on or within the display panel 200A, the spacer layer may be made of a transparent material.

According to the embodiment, when the spacer layer is disposed within the display panel 200A, the spacer layer may be an air gap which is included during the manufacture of the display panel 200A and/or a backlight unit. When the display panel 200A and/or the backlight unit includes one air gap, the one air gap may function as the spacer layer. When the display panel 200A and/or the backlight unit includes a plurality of the air gaps, the plurality of air gaps may collectively function as the spacer layer.

In the touch sensor 10 and/or the pressures sensor including the first electrode 620 or the second electrode 621, when the display panel 200A is the LCD panel, at least one of a data line, a gate line, a common electrode, and a pixel electrode may be used as the touch sensor 10 and/or the pressure sensor. Also, when the display panel 200A is the OLED panel, at least one of a gate line, a data line, a first power line (ELVDD), and a second power line (ELVSS)

may be used as the touch sensor 10 and/or the pressure sensor. In addition, according to the embodiment, at least one of the electrodes included in the display panel other than the electrodes described herein may be used as the touch sensor 10 and/or the pressure sensor.

The foregoing has described the touch input device which detects the touch pressure by using the electrode used to detect the touch position and/or the electrode used to drive the display panel. Hereinafter, the following detailed description will be provided by taking an example of a case where a separate electrode which is different from the electrode used to detect the touch position and the electrode used to drive the display panel is disposed, in order to detect the touch pressure in the touch input device according to the embodiment of the present invention.

In the touch input device 1000 according to the embodiment of the present invention, the pressures sensors 450 and 460 may be configured in the form of an electrode sheet and may be attached to the touch input device 1000 including the display module 200 and a substrate 300. The display module 200 of the touch input device 1000 according to the embodiment of the present invention may include the display panel 200A and a configuration for driving the display panel 200A. Specifically, when the display panel 200A is the LCD panel, the display module 200 may include the LCD panel and a backlight unit (not shown) and may further include a display panel control IC for operation of the LCD panel, a graphic control IC, and other circuits.

FIGS. 4a to 4f show an example in which the electrode sheet according to the embodiment of the present invention is applied to the touch input device.

In the touch input device 1000 according to the embodiment of the present invention, by means of an adhesive like an optically clear adhesive (OCA), lamination may occur between a cover layer 100 on which the touch sensor for detecting the touch position has been formed and the display module 200. As a result, the display color clarity, visibility and optical transmittance of the display module 200, which can be recognized through the touch surface of the touch sensor, can be improved.

Figure 4A:
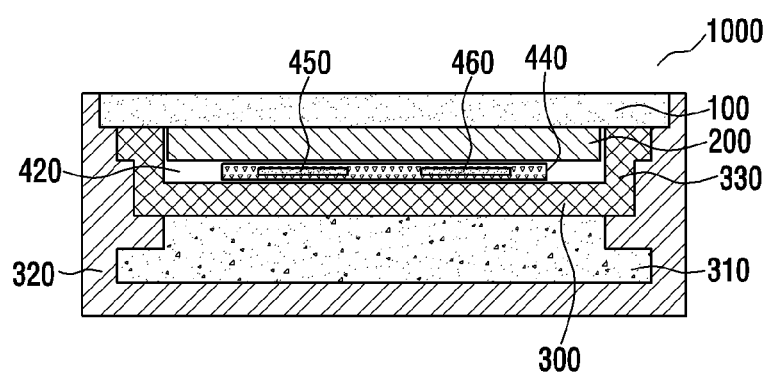
FIGS. 4a to 4f show an example in which a pressure electrode configured in the form of an electrode sheet is attached in the touch input device according to the embodiment of the present invention.
Figure 4B:
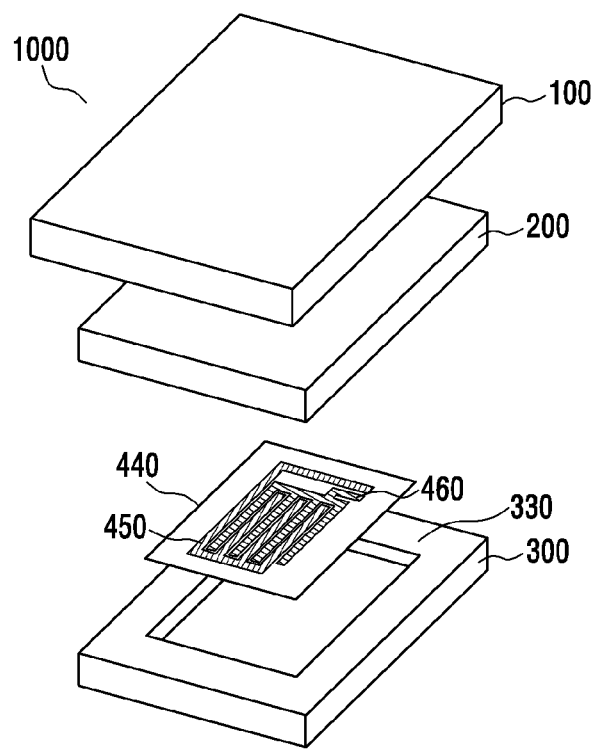

In the description with reference to FIGS. 4a to 4f, it is shown that as the touch input device 1000 according to the embodiment of the present invention, the cover layer 100 in which the touch sensor has been formed is, as shown in FIGS. 3a and 3d, laminated on and attached to the display module 200 by means of an adhesive. However, the touch input device 1000 according to the embodiment of the present invention may include that the touch sensor 10 is, as shown in FIGS. 3b and 3e, disposed within the display module 200. More specifically, while FIGS. 4a and 4b show that the cover layer 100 where the touch sensor has been formed covers the display module 200, the touch input device 1000 which includes the touch sensor 10 disposed within the display module 200 and includes the display module 200 covered with the cover layer 100 like glass may be used as the embodiment of the present invention.

The touch input device 1000 to which the electrode sheet according to the embodiment of the present invention can be applied may include an electronic device including the touch screen, for example, a cell phone, a personal data assistant (PDA), a smart phone, a tablet personal computer, an MP3 player, a laptop computer, etc.

In the touch input device 1000 to which the electrode sheet according to the embodiment of the present invention can be applied, a substrate 300, together with an outermost housing 320 of the touch input device 1000, may function to surround a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor 10 or the cover layer 100 of the touch input device 1000 may be formed wider than the display module 200, the substrate 300, and the mounting space 310. As a result, the housing 320 may be formed such that the housing 320, together with the touch sensor 10, surrounds the display module 200, the substrate 300, and the circuit board.

The touch input device 1000 according to the embodiment of the present invention can detect the touch position through the touch sensor 10 and can detect the touch pressure by disposing the electrode sheet 440 between the display module 200 and the substrate 300. Here, the touch sensor 10 may be disposed inside or outside the display module 200.

Hereinafter, the components which include the electrode sheet 440 and are for pressure detection are collectively referred to as a pressure detection module 400. For example, in the embodiment, the pressure detection module 400 may include the electrode sheet 440 and/or the spacer layer 420.

As described above, the pressure detection module 400 includes, for example, the spacer layer 420 composed of an air gap. This will be described in detail with reference to FIGS. 4b to 4f. According to the embodiment, the spacer layer 420 may be made of an impact absorbing material. According to the embodiment, the spacer layer 420 may be filled with a dielectric material.

FIG. 4b is a perspective view of the touch input device 1000 according to the embodiment of the present invention. As shown in FIG. 4b, the electrode sheet 440 of the first example of the present invention may be disposed between the display module 200 and the substrate 300 in the touch input device 1000. Here, the touch input device 1000 may include the spacer layer disposed between the display module 200 and the substrate 300 of the touch input device 1000 in order to dispose the electrode sheet 440.

Hereafter, for the purpose of clearly distinguishing the electrodes 450 and 460 from the electrode included in the touch sensor 10, the electrodes 450 and 460 for detecting the pressure are designated as pressure electrodes 450 and 460. Here, since the pressure electrodes 450 and 460 are disposed in the rear side instead of in the front side of the display panel, the pressure electrodes 450 and 460 can be made of an opaque material as well as a transparent material.

Here, a frame 330 having a predetermined height may be formed along the border of the upper portion of the substrate 300 in order to maintain the spacer layer 420 in which the electrode sheet 440 is disposed. Here, the frame 330 may be bonded to the cover layer 100 by means of an adhesive tape (not shown). While FIG. 4b shows the frame 330 is formed on the entire border (e.g., four sides of the quadrangle) of the substrate 300, the frame 330 may be formed only on at least some (e.g., three sides of the quadrangle) of the border of the substrate 300. According to the embodiment, the frame 330 may be formed on the top surface of the substrate 300 may be integrally formed with the substrate 300 on the top surface of the substrate 300. In the embodiment of the present invention, the frame 330 may be made of an inelastic material. In the embodiment of the present invention, when a pressure is applied to the display module 200 through the cover layer 100, the display module 200, together with the cover layer 100, may be bent. Therefore, the magnitude of the touch pressure can be detected even though the frame 330 is not deformed by the pressure.

Figure 4C:
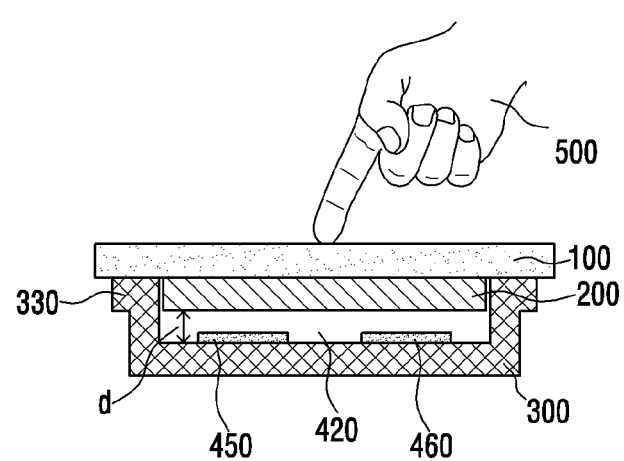

FIG. 4c is a cross sectional view of the touch input device including the pressure electrode of the electrode sheet according to the embodiment of the present invention. Although FIG. 4c and some of the following figures show that the pressure electrodes 450 and 460 are separated from the electrode sheet 440, this is only for convenience of description. The pressure electrodes 450 and 460 may be included in the electrode sheet 440. As shown in FIG. 4c, the electrode sheet 440 including the pressure electrodes 450 and 460 according to the embodiment of the present invention may be disposed within the spacer layer 420 and on the substrate 300.

The pressure electrode for detecting the pressure may include the first electrode 450 and the second electrode 460. Here, any one of the first electrode 450 and the second electrode 460 may be a drive electrode, and the other may be a receiving electrode. A drive signal is applied to the drive electrode, and a sensing signal may be obtained through the receiving electrode. When a voltage is applied, a mutual capacitance may be generated between the first electrode 450 and the second electrode 460.

Figure 4D:
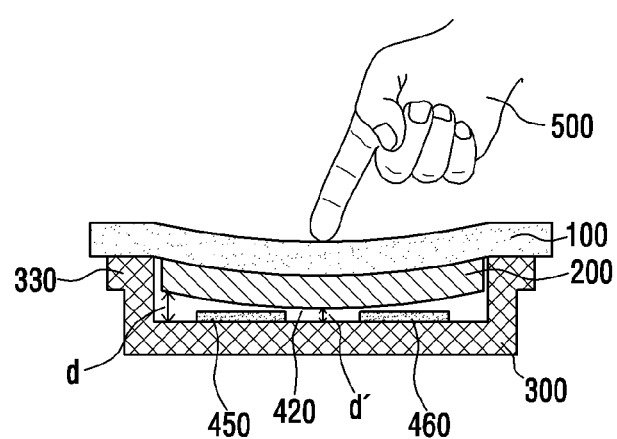

FIG. 4d is a cross sectional view when pressure is applied to the touch input device 1000 shown in FIG. 4c. The bottom surface of the display module 200 may have a ground potential so as to block the noise. When pressure is applied to the surface of the cover layer 100 by an object 500, the cover layer 100 and the display module 200 may be bent or pressed. As a result, a distance "d" between the ground potential surface and the pressure electrodes 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

Although it has been described in FIG. 4d that the bottom surface of the display module 200 has the ground potential, that is to say, is the reference potential layer, the reference potential layer may be disposed inside the display module 200. Here, when a pressure is applied to the surface of the cover layer 100 by the object 500, the cover layer 100 and the display module 200 may be bent or pressed. As a result, a distance between the pressure electrodes 450 and 460 and the reference potential layer disposed within the display module 200 changes. Therefore, the magnitude of the touch pressure can be calculated by obtaining the capacitance change amount from the sensing signal obtained through the receiving electrode.

In the touch input device 1000 to which the electrode sheet 440 is applied according to the embodiment of the present invention, the display module 200 may be bent or pressed by the touch applying the pressure. The display module 200 may be bent or pressed to show deformation by the touch. When the display module 200 is bent or pressed according to the embodiment, a position showing the biggest deformation may not match the touch position. However, the display module 200 may be shown to be bent at least at the touch position. For example, when the touch position approaches close to the border, edge, etc., of the display module 200, the most bent or pressed position of the display module 200 may not match the touch position, however, the display module 200 may be shown to be bent or pressed at least at the touch position.

Figure 5:
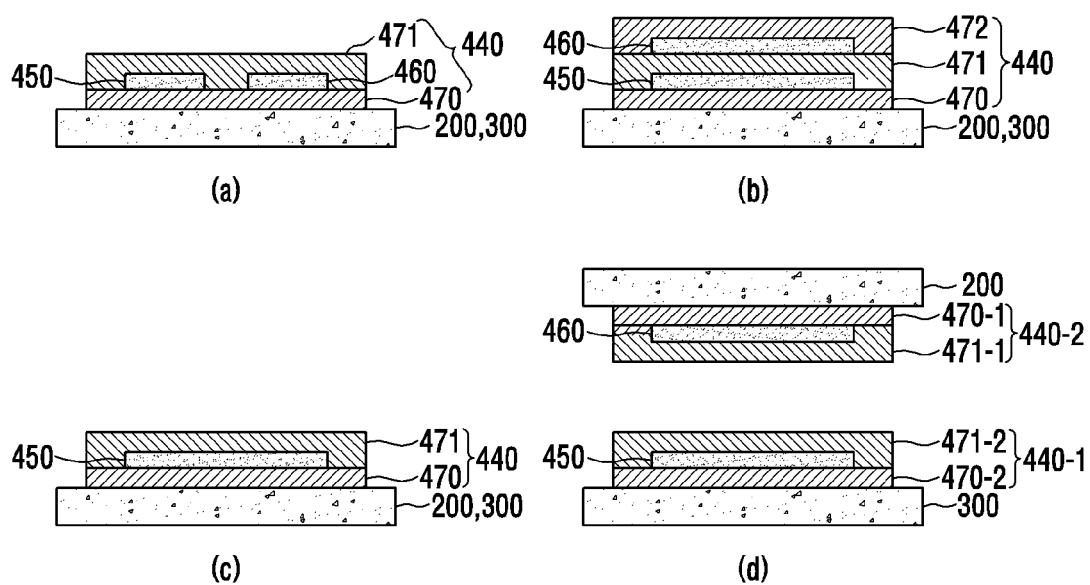
FIG. 5 shows a cross section of the electrode sheet according to the embodiment of the present invention.

Here, the top surface of the substrate 300 may have the ground potential for shielding the noise. FIG. 5 shows a cross section of the electrode sheet according to the embodiment of the present invention. Referring to (a) of FIG. 5, the cross sectional view shows that the electrode sheet 440 including the pressure electrodes 450 and 460 has been attached to the substrate 300 or the display module 200. Here, a short-circuit can be prevented from occurring between the pressure electrodes 450 and 460 and either the substrate 300 or the display module 200 because the pressure electrodes 450 and 460 are disposed between the first insulation layer 470 and the second insulation layer 471 in the electrode sheet 440. Further, depending on the type and/or implementation method of the touch input device 1000, the substrate 300 or the display module 200 to which the pressure electrodes 450 and 460 are attached may not have the ground potential or may have a weak ground potential. In this case, the touch input device 1000 according to the embodiment of the present invention may further include a ground electrode (not shown) between the insulation layer 470 and either the substrate 300 or the display module 200. According to the embodiment of the present invention, the touch input device 1000 invention may further include another insulation layer (not shown) between the ground electrode and either the substrate 300 or the display module 200. Here, the ground electrode (not shown) is able to prevent the size of the capacitance generated between the first electrode 450 and the second electrode 460, which are pressure electrodes, from increasing excessively.

Figure 4E:
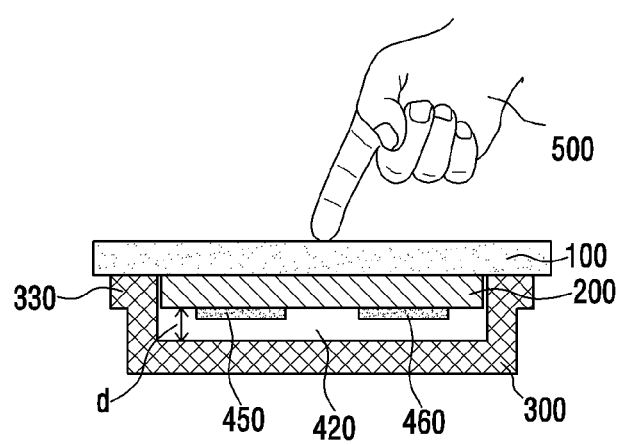

FIG. 4e shows that the electrode sheet 440 including the pressure electrodes 450 and 460 according to the embodiment of the present invention is formed on the bottom surface of the display module 200. Here, the substrate 300 may have a ground potential. Therefore, the distance "d" between the substrate 300 and the pressure electrodes 450 and 460 is reduced by touching the touch surface of the cover layer 100. As a result, this may cause the change of the mutual capacitance between the first electrode 450 and the second electrode 460.

In the state where the first electrode 450 and the second electrode 460 are formed in the same layer, each of the first electrode 450 and the second electrode 460 shown in FIG. 5 may be, as shown in FIG. 9a, composed of a plurality of lozenge-shaped electrodes. Here, the plurality of the first electrodes 450 are connected to each other in the first axial direction, and the plurality of the second electrodes 460 are connected to each other in the second axial direction orthogonal to the first axial direction. The lozenge-shaped electrodes of at least one of the first electrode 450 and the second electrode 460 are connected to each other through a bridge, so that the first electrode 450 and the second electrode 460 may be insulated from each other. Also, here, the first electrode 450 and the second electrode 460 shown in FIG. 5 may be composed of an electrode having a form shown in FIG. 9b.

It is possible to consider that the first electrode 450 and the second electrode 460 are formed in different layers in accordance with the embodiment of the present invention so that an electrode layer is formed. In (b) of FIG. 5, the cross sectional view shows that the first electrode 450 and the second electrode 460 are formed in different layers. As shown in (b) of FIG. 5, the first electrode 450 may be formed on the first insulation layer 470, and the second electrode 460 may be formed on the second insulation layer 471 located on the first electrode 450. According to the embodiment of the present invention, the second electrode 460 may be covered with a third insulation layer 472. In other words, the electrode sheet 440 may include the first to third insulation layers 470 to 472, the first electrode 450, and the second electrode 460. Here, the first electrode 450 and the second electrode 460 may be implemented so as to overlap each other because they are disposed in different layers. For example, the first electrode 450 and the second electrode 460 may be, as shown in FIG. 9c, formed similarly to the pattern of the drive electrode TX and receiving electrode RX which are arranged in the form of M×N array. Here, M and N may be natural numbers greater than 1. Also, as shown in FIG. 9a, the lozenge-shaped first electrode 450 and the lozenge-shaped second electrode 460 may be located in different layers respectively.

In the foregoing, it is shown that the touch pressure is detected from the change of the mutual capacitance between the first electrode 450 and the second electrode 460. However, the electrode sheet 440 may be configured to include only any one of the first electrode 450 and the second electrode 460. In this case, it is possible to detect the magnitude of the touch pressure by detecting the change of the capacitance between the one pressure electrode and a ground layer (the reference potential layer disposed on the display module 200, on the substrate 300, or within the display module 200), that is to say, the change of the self-capacitance. Here, the drive signal is applied to the one pressure electrode, and the change of the self-capacitance between the pressure electrode and the ground layer can be detected by the pressure electrode.

For instance, in FIG. 4c, the pressure electrode included in the electrode sheet 440 may be configured to include only the first electrode 450. Here, the magnitude of the touch pressure can be detected by the change of the capacitance between the first electrode 450 and the display module 200, which is caused by a distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the embodiment related to FIG. 4e. Here, the pressure electrode should not necessary have a comb teeth shape or a trident shape, which is required to improve the detection accuracy of the mutual capacitance change amount. One of the first electrode 450 and the second electrode 460 may have one plate shape (e.g., quadrangular plate), and the other electrodes may be, as shown in FIG. 9d, disposed at a regular interval in the form of a grid.

In (c) of FIG. 5, the cross sectional view shows that the electrode sheet 440 is implemented to include only the first electrode 450. As shown in (c) of FIG. 5, the electrode sheet 440 including the first electrode 450 may be disposed on the substrate 300 or the display module 200.

Figure 4F:
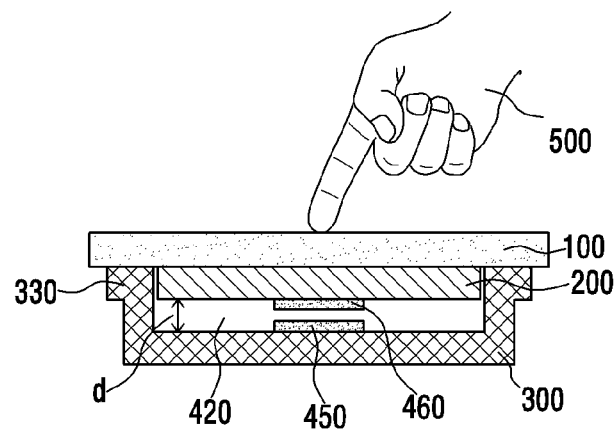

FIG. 4f shows that the pressure electrodes 450 and 460 are formed within the spacer layer 420 and on the top surface of the substrate 300 and on the bottom surface of the display module 200. The electrode sheet is composed of a first electrode sheet 440-1 including the first electrode 450 and a second electrode sheet 440-2 including the second electrode 460. Here, one of the first electrode 450 and the second electrode 460 may be formed on the substrate 300 and the other may be formed on the bottom surface of the display module 200. FIG. 4f shows that the first electrode 450 is formed on the substrate 300 and the second electrode 460 is formed on the bottom surface of the display module 200.

When the object 500 applies a pressure to the surface of the cover layer 100, the cover layer 100 and the display module 200 may be bent or pressed. As a result, a distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode. Here, in FIG. 4f, since the first electrode 450 and the second electrode 460 are formed in different layers, the first electrode 450 and the second electrode 460 should not necessary have a comb teeth shape or a trident shape. Each of the first electrode 450 and the second electrode 460 may have one plate shape (e.g., quadrangular plate), and the plurality of first electrodes 450 and the plurality of second electrodes may be, as shown in FIG. 9d, disposed at a regular interval in the form of a grid.

In (d) of FIG. 5, the cross sectional view shows that the first electrode sheet 440-1 including the first electrode 450 is attached to the substrate 300, and the second electrode sheet 440-2 including the second electrode 460 is attached to the display module 200. As shown in (d) of FIG. 5, the first electrode sheet 440-1 including the first electrode 450 may be disposed on the substrate 300. Also, the second electrode sheet 440-2 including the second electrode 460 may be disposed on the bottom surface of the display module 200.

As with the description related to (a) of FIG. 5, when the substrate 300 or the display module 200 to which the pressure electrodes 450 and 460 are attached may not have the ground potential or may have a weak ground potential, the electrode sheet 440 in (a) to (d) of FIG. 5 may further include a ground electrode (not shown) between the first insulation layers 470, 470-1, and 470-2 and either the substrate 300 or the display module 200. Here, the electrode sheet 440 may further include an additional insulation layer (not shown) between the ground electrode (not shown) and either the substrate 300 or the display module 200.

Figure 6A:
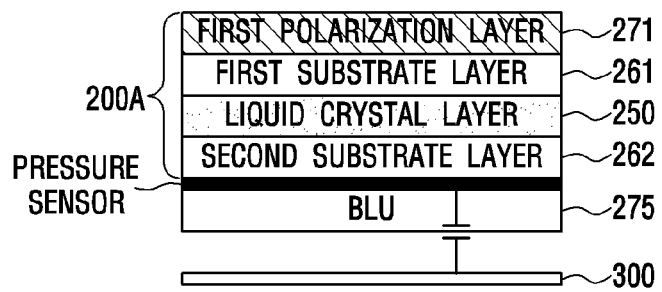
FIGS. 6a to 6c show an example in which the pressure electrode is directly formed in the touch input device according to the embodiment of the present invention.
Figure 6B:
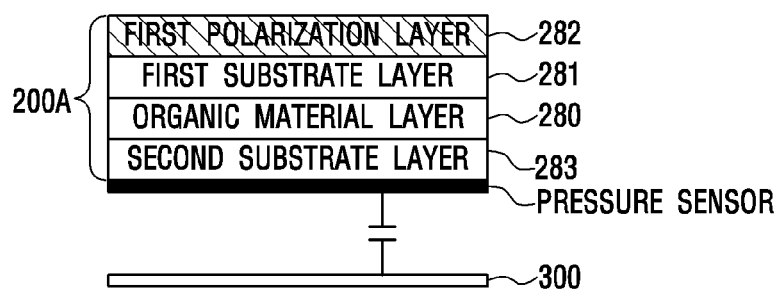
Figure 6C:
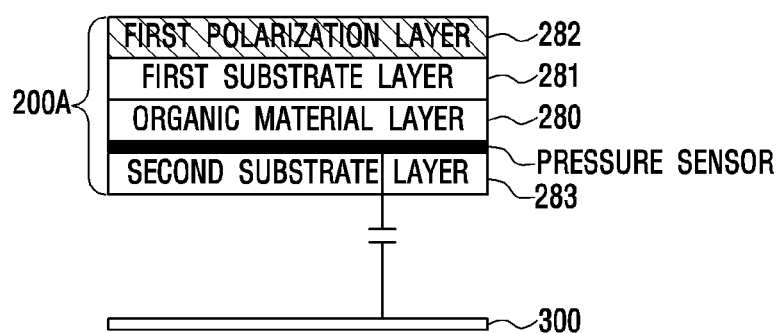

In the touch input device 1000 according to the embodiment of the present invention, the pressure electrodes 450 and 460 for sensing the capacitance change amount may be directly formed on the display panel 200A. FIGS. 6a to 6c are cross sectional views showing an embodiment of the pressure electrodes 450 and 460 formed directly on various display panels 200A.

First, FIG. 6a shows the pressure electrodes 450 and 460 formed on the display panel 200A using the LCD panel. Specifically, as shown in FIG. 6a, the pressure electrodes 450 and 460 may be formed on the bottom surface of the second substrate layer 262. Here, while the second polarization layer 272 is omitted in FIG. 6a, the second polarization layer 272 may be disposed between the pressure electrodes 450 and 460 and a backlight unit 275 or between the pressure electrodes 450 and 460 and the second layer 262. In detecting the touch pressure on the basis of the mutual capacitance change amount when pressure is applied to the touch input device 1000, a drive signal is applied to the drive electrode 450, and an electrical signal including information on the capacitance which is changed by the distance change between the pressure electrodes 450 and 460 and the reference potential layer 300 separated from the pressure electrodes 450 and 460 is received from the receiving electrode 460. When the touch pressure is detected on the basis of the self-capacitance change amount, a drive signal is applied to the pressure electrodes 450 and 460, and an electrical signal including information on the capacitance which is changed by the distance change between the pressure electrodes 450 and 460 and the reference potential layer 300 separated from the pressure electrodes 450 and 460 is received from the pressure electrodes 450 and 460.

Next, FIG. 6b shows the pressure electrodes 450 and 460 formed on the bottom surface of the display panel 200A using the OLED panel (in particular, AM-OLED panel). Specifically, the pressure electrodes 450 and 460 may be formed on the bottom surface of the second substrate layer 283. Here, a method for detecting the pressure is the same as that described in FIG. 6a.

Next, FIG. 6c shows the pressure electrodes 450 and 460 formed inside the display panel 200A using the OLED panel. Specifically, the pressure electrodes 450 and 460 may be formed on the top surface of the second substrate layer 283. Here, a method for detecting the pressure is the same as that described in FIG. 6a.

Also, although the display panel 200A using the OLED panel has been described by taking an example thereof with reference to FIG. 6c, it is possible that the pressure electrodes 450 and 460 are formed on the top surface of the second substrate layer 283 of the display panel 200A using the LCD panel.

Also, although it has been described in FIGS. 6a to 6c that the pressure electrodes 450 and 460 are formed on the top surfaces or bottom surfaces of the second substrate layers 262 and 283, it is possible that the pressure electrodes 450 and 460 are formed on the top surfaces or bottom surfaces of the first substrate layers 261 and 281.

In the touch input device 1000 according to the embodiment of the present invention, the pressure electrodes 450 and 460 for sensing the capacitance change amount may be composed of the first electrode 450 which is directly formed on the display panel 200A and the second electrode 460 which is configured in the form of an electrode sheet. Specifically, the first electrode 450 may be, as described in FIGS. 6a to 6c, directly formed on the display panel 200A, and second electrode 460 may be, as described in FIGS. 4 to 5, configured in the form of a sensor sheet and may be attached to the touch input device 1000.

In the detection of the touch pressure by using the pressure sensor described in FIG. 3 or the pressure electrodes 450 and 460 described in FIGS. 4 to 6, there is noise influence between touch position sensing and/or touch pressure sensing and display panel in accordance with frequency which is used to sense the touch position and/or frequency which is used to sense the touch pressure and frequency which is used to drive the display panel. Particularly, when the pressure sensor described in FIG. 3 or the pressure electrodes 450 and 460 described in FIGS. 4 to 6 is disposed close to the display module 200, the influence of noise may further increase.

In the touch input device 1000 according to the embodiment of the present invention, the signals input to the display panel may include a scan signal, a data signal, a vertical synchronization signal, a horizontal synchronization signal, a clock, etc. The scan signal is sequentially input to a scan lines arranged in rows in the form of a square wave. The data signal is input to the display panel in response to the scan signal. Here, in the touch input device 1000 according to the embodiment of the present invention, when it is assumed that the resolution of the display is 1920×1080 and a driving frequency is 60 Hz, the scan signal is input to the same line at an interval of 16.6 ms. Here, when it is assumed that the scan signal is sequentially input to 1,920 scan lines and the horizontal synchronization signal is refreshed along each of the 1,920 scan lines, the interval between adjacent refreshed horizontal synchronization signals is approximately 8.68 us, and this is converted into a frequency of about 115.2 kHz.

Figure 7A:
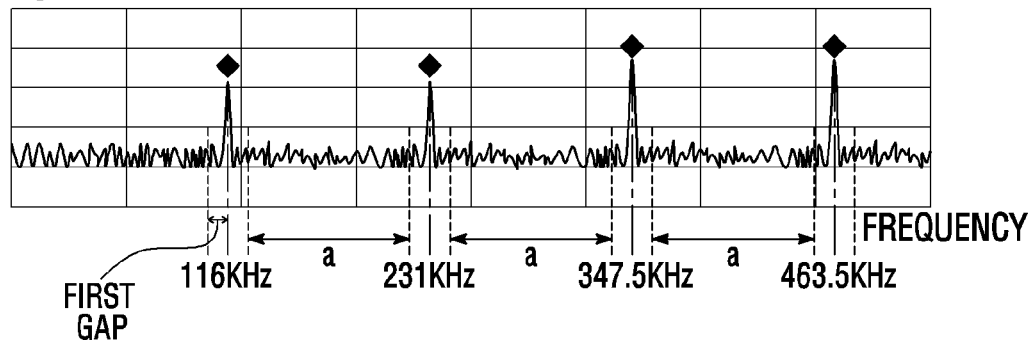
FIGS. 7a to 7c are views showing a result obtained by measuring a signal generated from the display panel of the touch input device according to the embodiment of the present invention.

FIG. 7a is a view showing a result obtained by measuring a signal generated from the display panel of the touch input device, which has a resolution of 1920×1080, through a spectrum analyzer, etc.

As shown in FIG. 7a, it can be seen that the frequency of the horizontal synchronization signal has its fundamental frequency of about 116 kHz and display noise occurs at a harmonic frequency which is n times the fundamental frequency (n is a natural number).

Here, when frequency $f_{3D}$ used to sense the touch pressure approaches to the frequency of the horizontal synchronization signal and the harmonic frequency of the horizontal synchronization signal, a phenomenon such as flicker occurs in the display panel by the noise which is generated during the touch pressure sensing. As a result, display quality may be degraded. Therefore, in order to reduce the influence of the noise which is generated during the touch pressure sensing on the display panel, an experiment has been performed to determine whether the display quality is degraded or not by adjusting the frequency $f_{3D}$ used to sense the touch pressure to gradually differ from the frequency of the horizontal synchronization signal and the harmonic frequency of the horizontal synchronization signal.

Table 1 shows a result obtained by measuring the intensity of display flicker caused by the change of the frequency $f_{3D}$ used to sense the touch pressure on the basis of the second harmonic frequency of 231 kHz of the horizontal synchronization signal shown in FIG. 7a.

TABLE 1

| Frequency $f_{3D}$ (kHz) used to sense touch pressure | Intensity of display flicker |
| --- | --- |
| 217 | No intensity |
| 219 | Very weak |
| 221 | Very weak |
| 223 | Weak |
| 225 | Weak |
| 227 | Medium |
| 229 | High |
| 231 | High |
| 233 | High |
| 235 | Medium |
| 237 | Weak |
| 239 | Weak |
| 241 | Very weak |
| 243 | Very weak |
| 245 | No intensity |

Here, when the intensity of display flicker is high or medium, the flicker of an image displayed on the screen can be sensed by the naked eye of a person. When the intensity of display flicker is weak or very weak, the flicker of the image displayed on the screen can be hardly sensed by the naked eye of a person. Therefore, it is preferable not to set the frequency $f_{3D}$ used to sense the touch pressure in the interval in which the intensity of display flicker is high or medium. That is to say, it is preferable the frequency $f_{3D}$ used to sense the touch pressure should be set in such a way as to have a minimum gap of 5 kHz from the frequency of the horizontal synchronization signal and the harmonic frequency of the horizontal synchronization signal. In other words, as shown in FIG. 7a, it is preferable that the frequency $f_{3D}$ used to sense the touch pressure should be set within an interval "a", that is, a frequency interval in which the frequency of the horizontal synchronization signal and the harmonic frequency of the horizontal synchronization signal, which is used to drive the display panel, do not exist within the first gap (5 kHz) from the frequency $f_{3D}$ used to sense the touch pressure.

Figure 7B:
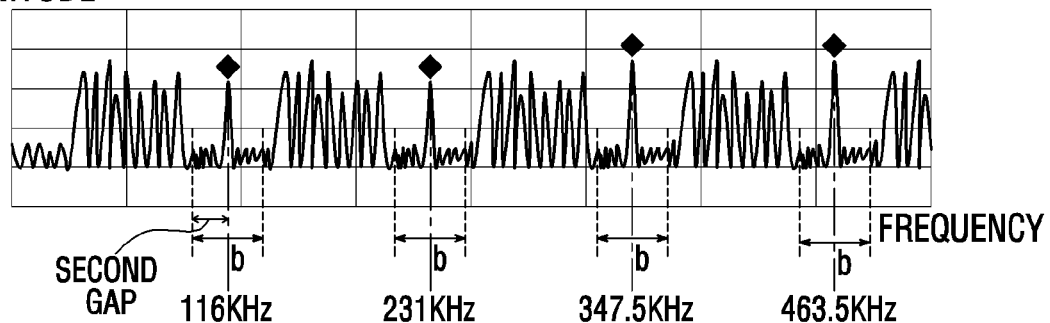

FIG. 7b shows, when a vertical resolution pattern in which a plurality of horizontal lines parallel to each other are shown on the entire screen of the touch input device with a resolution of 1920×1080 is displayed, a result obtained by measuring a signal generated from the display panel, through a spectrum analyzer, etc.

As shown in FIG. 7b, it can be seen that the frequency of the horizontal synchronization signal has its fundamental frequency of about 116 kHz and display noise occurs at a harmonic frequency which is n times the fundamental frequency (n is a natural number) and it can be also seen that, apart from the noise caused by the refreshment of the horizontal synchronization signal, noise due to the display of the vertical resolution pattern occurs in a frequency interval spaced apart by a predetermined distance from the frequency of the horizontal synchronization signal and the harmonic frequency of the horizontal synchronization signal. Here, the vertical resolution pattern refers to a form in which a straight line shaped object appears repeatedly from the top to the bottom of the entire screen in a transverse direction.

Here, when frequency $f_{2D}$ used to sense the touch position is included in a frequency band where display noise occurs, the sensitivity of the touch position sensing may be reduced by the display noise. Therefore, in order to remove the influence of the display noise on the touch position sensing, it is desirable that the frequency $f_{2D}$ used to sense the touch position should be set to frequency at which no display noise occurs. Therefore, in order to reduce the influence of the display noise on the sensitivity of the touch position sensing, an experiment has been performed to determine whether the sensitivity of the touch position sensing is reduced or not by adjusting the frequency $f_{2D}$ used to sense the touch position to gradually differ from the harmonic frequency of the horizontal synchronization signal.

Table 2 shows a result obtained by measuring the amount of display noise caused by the change of the frequency $f_{2D}$ used to sense the touch position on the basis of the second harmonic frequency of 231 kHz of the horizontal synchronization signal shown in FIG. 7b.

TABLE 2

| Frequency $f_{2D}$ (kHz) used to sense the touch position | Display noise measurement value |
| --- | --- |
| 173 | 542 |
| 175 | 127 |
| 177 | 81 |
| 179 | 162 |
| 181 | 85 |
| 183 | 297 |
| 185 | 68 |
| 187 | 46 |
| 189 | 105 |
| 191 | 75 |
| 193 | 112 |
| 195 | 64 |
| 197 | 54 |
| 199 | 69 |
| 201 | 95 |
| 203 | 98 |
| 205 | 91 |
| 207 | 86 |
| 209 | 64 |
| 211 | 96 |
| 213 | 58 |
| 215 | 44 |
| 217 | 27 |

TABLE 2-continued

| Frequency $f_{2D}$ (kHz) used to sense the touch position | Display noise measurement value |
| --- | --- |
| 219 | 41 |
| 221 | 34 |
| 223 | 32 |
| 225 | 19 |
| 227 | 45 |
| 229 | 51 |
| 231 | 187 |
| 233 | 74 |
| 235 | 45 |
| 237 | 53 |
| 239 | 48 |
| 241 | 66 |
| 243 | 67 |
| 245 | 22 |
| 247 | 57 |
| 249 | 77 |
| 251 | 147 |
| 253 | 62 |
| 255 | 74 |
| 257 | 93 |
| 259 | 90 |
| 261 | 240 |

According to the measurement result, it can be found that the amount of display noise is approximately equal to or less than 80 in a ±20 Hz interval from the harmonic frequency of the horizontal synchronization signal and the amount of display noise is increased greater than about 90 in an interval which has a gap exceeding or below 20 Hz from the harmonic frequency of the horizontal synchronization signal. That is, it is preferable that the frequency $f_{2D}$ used to sense the touch position should be set within about 20 kHz from the harmonic frequency of the horizontal synchronization signal. In other words, as shown in FIG. 7b, it is preferable that the frequency $f_{2D}$ used to sense the touch position should be set within an interval "b", that is, a frequency interval in which the frequency of the horizontal synchronization signal and the harmonic frequency of the horizontal synchronization signal, which are used to drive the display panel, exist within the second gap (20 kHz) from the frequency $f_{3D}$ used to sense the touch pressure.

Figure 7C:
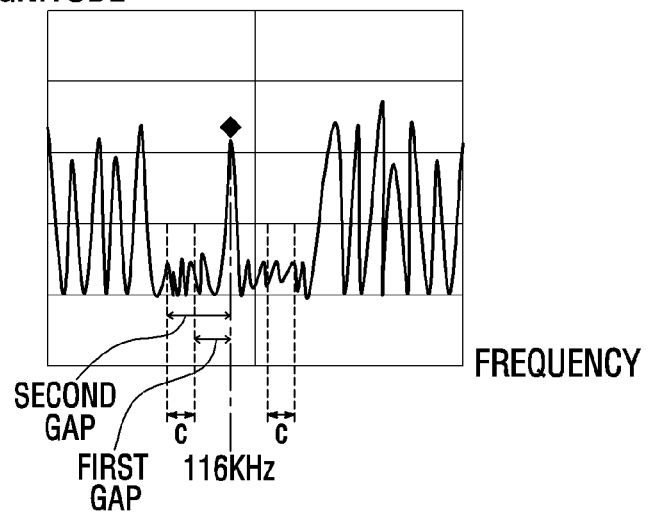

FIG. 7c is an enlarged view of FIG. 7b.

In the touch input device 1000 according to the embodiment of the present invention, the frequency $f_{2D}$ used to sense the touch position may be equal to the frequency $f3_D$ used to sense the touch pressure. In this case, as shown in FIG. 7c, when the frequency of the horizontal synchronization signal and the harmonic frequency of the horizontal synchronization signal, which are used to drive the display panel, do not exist within the first gap (5 kHz) from the frequencies $_{2D}$ and $f_{3D}$ which are used to sense the touch position and touch pressure and when the frequencies $_{2D}$ and $f_{3D}$ which are used to sense the touch position and touch pressure are set within an interval "c" in which the frequency of the horizontal synchronization signal and the harmonic frequency of the horizontal synchronization signal, which is used to drive the display panel, exist within the second gap (20 kHz), it is possible to prevent not only the display quality from being degraded due to the noise generated by the touch pressure sensing but the sensitivity of the touch position sensing from being reduced by the display noise.

Figure 8:
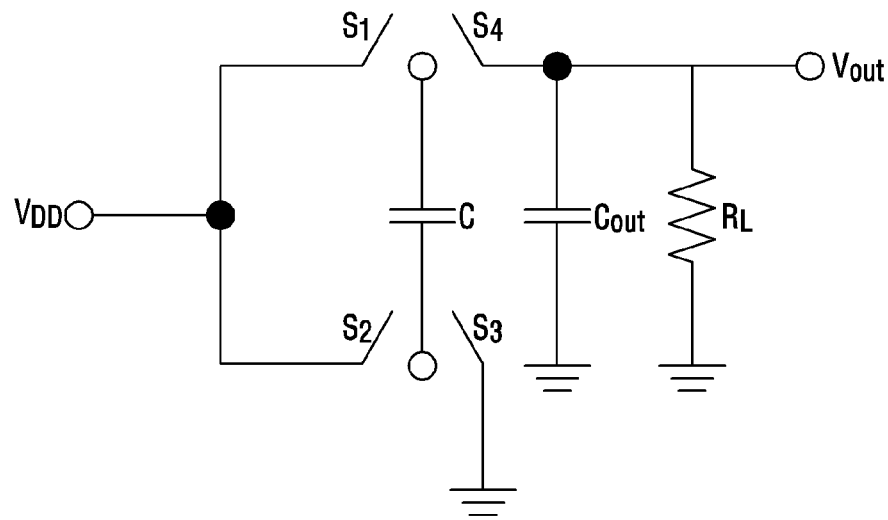
FIG. 8 is a view showing a charge pump circuit included in the touch input device according to the embodiment of the present invention.

FIG. 8 is a view showing a charge pump circuit included in the touch input device according to the embodiment of the present invention.

In the circuit shown in FIG. 8, first, voltage Vdd is charged in a capacitor C by closing a first switch S1 and a third switch S3. Subsequently, when the first switch S1 and the third switch S3 are opened and a second switch S2 and a fourth switch S4 are closed, voltage input from Vdd and Vdd charged in the capacitor C are added, and voltage of 2Vdd that is twice the Vdd is output to Vout. In a case where such a charge pump circuit is used in the touch sensing IC of the touch input device according to the embodiment of the present invention, when frequency of a clock driving the charge pump circuit is overlapped with the frequency $f_{2D}$ used to sense the touch position and/or the frequency $f3_D$ used to sense the touch pressure, the sensitivity of the touch position sensing and/or touch pressure sensing may be reduced. Therefore, the frequency $f_{2D}$ used to sense the touch position and the frequency $f3_D$ used to sense the touch pressure should not overlap with the charge pump drive clock frequency $f_{clock,\ charge\ pump}$. That is, the following conditions must be satisfied.

$$f_{2D,3D} < f_{clock, charge\ pump}, f_{2D,3D} \times n \neq f_{clock, charge\ pump} (n \text{ is a natural number})$$

$$f_{2D,3D} > f_{clock, charge\ pump}, f_{2D,3D} \times 1/n \neq f_{clock, charge\ pump} (n \text{ is a natural number})$$

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

The invention claimed is:

1. A touch input device capable of detecting a touch position and touch pressure, the touch input device comprising:
   a display panel;
   a touch sensor comprising a touch electrode which is used to detect the touch position;
   a substrate disposed under the display panel;
   a pressure sensor comprising a pressure electrode which is used to detect the touch pressure and is disposed between a bottom surface of the display panel and a top surface of the substrate,
      wherein a harmonic frequency of a horizontal synchronization signal, which is used to drive the display panel, does not exist within a first gap from a touch pressure sensing frequency which is used to drive the pressure sensor;
      wherein the first gap is 5 kHz;
      wherein the touch pressure is detected based on an electrical signal which is output from the pressure electrode according to a distance change between the pressure electrode and the substrate due to bending of the display panel; and
      wherein the touch pressure sensing frequency which is used to drive the pressure electrode is different than a touch position sensing frequency which is used to drive the touch electrode.

2. The touch input device of claim 1, further comprising a charge pump circuit,
   wherein, when a charge pump clock frequency which is used to drive the charge pump circuit is less than the touch pressure sensing frequency, the touch pressure sensing frequency is not equal to n times the charge pump clock frequency, and wherein, when the charge pump clock frequency is greater than the touch pressure sensing frequency, the touch pressure sensing frequency is not equal to 1/n times the charge pump clock frequency.

3. The touch input device of claim 1, wherein the harmonic frequency of the horizontal synchronization signal, which is used to drive the display panel, exists within a second gap from the touch position sensing frequency which is used to drive the touch sensor.

4. The touch input device of claim 3, wherein the second gap is 20 kHz.

5. The touch input device of claim 4, further comprising a charge pump circuit,
   wherein, when a charge pump clock frequency which is used to drive the charge pump circuit is less than the touch position sensing frequency, the touch position sensing frequency is not equal to n times the charge pump clock frequency, and wherein, when the charge pump clock frequency is greater than the touch position sensing frequency, the touch position sensing frequency is not equal to 1/n times the charge pump clock frequency.

6. The touch input device of claim 4, wherein the frequency of the horizontal synchronization signal exists within the second gap.

7. The touch input device of claim 1, wherein a frequency of the horizontal synchronization signal does not exist within the first gap.

8. A touch input device capable of detecting a touch position and touch pressure, the touch input device comprising:
   a display panel;
   a touch sensor comprising a touch electrode which is used to detect the touch position;
   a substrate disposed under the display panel;
   a pressure sensor comprising a pressure electrode which is used to detect the touch pressure and is disposed between a bottom surface of the display panel and a top surface of the substrate,
      wherein a touch pressure sensing frequency which is used to drive the pressure sensor is the same as a touch position sensing frequency which is used to drive the touch sensor,
      wherein a harmonic frequency of a horizontal synchronization signal, which is used to drive the display panel, does not exist within a first gap from the touch pressure sensing frequency, the harmonic frequency of the horizontal synchronization signal, which is used to drive the display panel, exists within a second gap from the touch position sensing frequency,
      wherein the first gap is 5 kHz and the second gap is 20 kHz;
      wherein the touch pressure is detected based on an electrical signal which is output from the pressure electrode according to a distance change between the pressure electrode and the substrate due to bending of the display panel; and
      wherein the touch pressure sensing frequency which is used to drive the pressure electrode is different than the touch position sensing frequency which is used to drive the touch electrode.

9. The touch input device of claim 8, further comprising a charge pump circuit,
   wherein, when a charge pump clock frequency which is used to drive the charge pump circuit is less than the touch pressure sensing frequency, the touch pressure sensing frequency is not equal to n times the charge pump clock frequency, and wherein, when the charge pump clock frequency is greater than the touch pressure sensing frequency, the touch pressure sensing frequency is not equal to 1/n times the charge pump clock frequency.

10. The touch input device of claim 8, wherein a frequency of the horizontal synchronization signal does not exist within the first gap, and wherein the frequency of the horizontal synchronization signal exists within the second gap.

11. A touch input device capable of detecting a touch position and touch pressure, the touch input device comprising:
- a display panel;
- a touch sensor comprising a touch electrode which is used to detect the touch position;
- a substrate disposed under the display panel;
- a pressure sensor comprising a pressure electrode which is used to detect the touch pressure and is disposed between a bottom surface of the display panel and a top surface of the substrate; and
- a charge pump circuit, wherein a harmonic frequency of a horizontal synchronization signal, which is used to drive the display panel, does not exist within a first gap from a touch pressure sensing frequency which is used to drive the pressure sensor, wherein, when a charge pump clock frequency which is used to drive the charge pump circuit is less than the touch pressure sensing frequency, the touch pressure sensing frequency is not equal to n times the charge pump clock frequency, wherein, when the charge pump clock frequency is greater than the touch pressure sensing frequency, the touch pressure sensing frequency is not equal to 1/n times the charge pump clock frequency;

wherein the touch pressure is detected based on an electrical signal which is output from the pressure electrode according to a distance change between the pressure electrode and the substrate due to bending of the display panel; and wherein the touch pressure sensing frequency which is used to drive the pressure electrode is different than a touch position sensing frequency which is used to drive the touch electrode.

12. The touch input device of claim 11, wherein the harmonic frequency of the horizontal synchronization signal, which is used to drive the display panel, exists within a second gap from the touch position sensing frequency which is used to drive the touch sensor.

13. The touch input device of claim 12, wherein the second gap is 20 kHz.

* * * * *